United States Patent Office
3,817,877
Patented June 18, 1974

3,817,877
PROCESS FOR THE POLYMERIZATION OF OXIRANE DERIVATIVES
Pierre Malfroid, Brussels, Belgium, assignor to
Solvay & Cie, Brussels, Belgium
Filed Apr. 20, 1973, Ser. No. 353,102
Claims priority, application France, May 8, 1972,
7216613
Int. Cl. C08g 23/14
U.S. Cl. 260—2 A
16 Claims

ABSTRACT OF THE DISCLOSURE

Polymerization of an oxirane derivative in contact with a catalyst system of an alkyl and alkoxy derivative of aluminium which is complexed by tetrahydrofuran, of the general formula

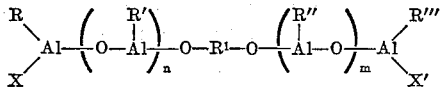

Figure 1:
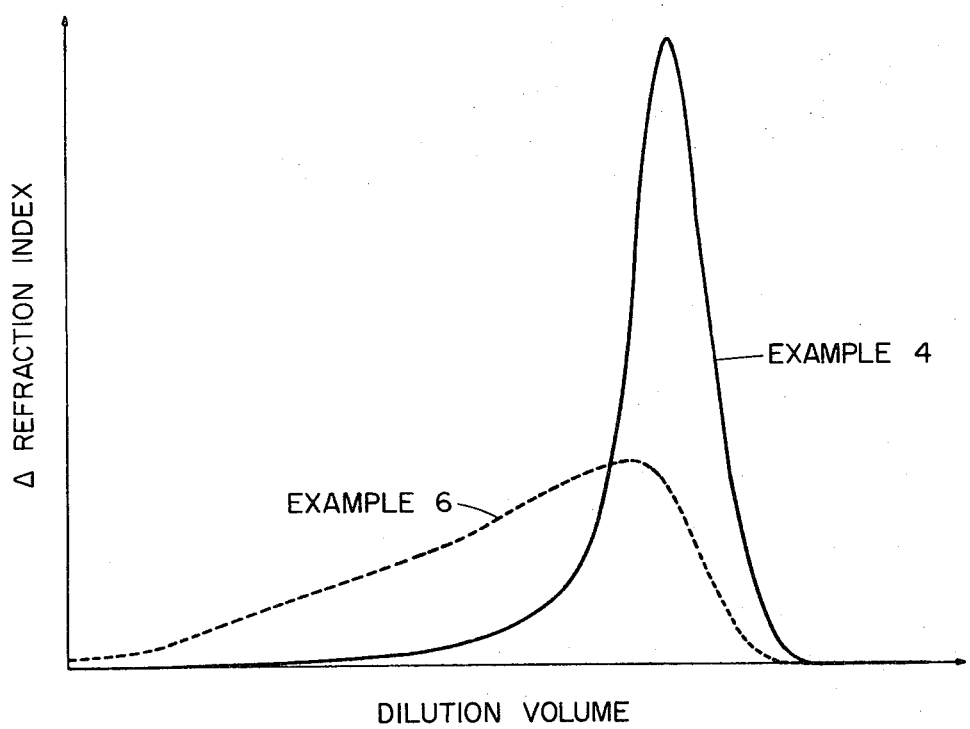

in which $n$ and $m$ represent whole numbers between 0 and 10, the total of which is equal to at least 1; R, R', R" and R''' represent hydrocarbon groups containing from 1 to 18 carbon atoms, X and X' represent hydrogen, chlorine, or a group R, and $R^1$ represents a hydrocarbon group containing from 2 to 20 carbon atoms.

BACKGROUND OF THE INVENTION

The present invention relates to an improved process for the polymerisation of oxirane derivatives, and more particularly to an improved process for the polymerisation of such derivatives in the presence of catalysts containing an alkylaluminium.

The polymerisation of alkene oxides in the presence of trialkylaluminium as catalyst is described in French Pat. No. 1,146,098 of February 2, 1956, filed in the name of Petrochemicals Ltd. The use of these catalysts leads to the formation of oily products of low molecular weight which are of little practical interest.

In French Pat. No. 1,229,090 of May 29, 1959 in the name of Hercules Powder Co. there are described improved catalysts for the production of solid polymers of epoxy compounds, which are composed of the reaction product of an organoaluminium compound, optionally complexed by tetrahydrofuran, and water. The solid polymers produced by this process have a very wide distribution of molecular weights, and they are heterogeneous and have poor stability. Moreover, the reaction speeds of these catalytic systems leave much to be desired.

United States Pat. No. 3,058,923 of July 1, 1960 in the name of Hercules Powder Co. describes a process for the production of solid polyepihalohydrins having particularly high molecular weights, in contact with a catalyst composed of the product resulting from the mixing, in any order, of a trialkylaluminium or a dialkylaluminium hydride, a diol, and tetrahydrofuran. The disadvantage of this process consists of the low activity of the catalytic system, which necessitates very long reaction times in order to obtain advantageous conversion rates.

BRIEF SUMMARY OF THE INVENTION

The applicants have now found an improved process for the polymerization of oxirane derivatives which ensures very markedly improved conversion rates and reaction speeds, as well as high yields of solid, homogeneous, and substantially amorphous polymers and copolymers which have very high molecular weights and viscosities.

The process of the invention involves polymerizing at least one oxirane derivative in contact with a catalytic system of an alkyl and alkoxyl derivative of aluminium which is complexed by tetrahydrofuran, of the general formula

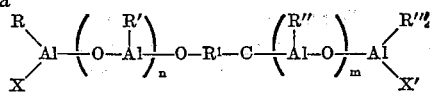

in which $n$ and $m$ represent whole numbers between 0 and 10, the total of which is equal to at least 1; R, R', R" and R''' represent hydrocarbon groups containing from 1 to 18 carbon atoms, X and X' represent hydrogen, chlorine, or a group R, and $R^1$ represents a hydrocarbon group containing from 2 to 20 carbon atoms.

DETAILED DESCRIPTION

The catalytic system of the invention is a new system which cannot in any way be identified with the catalytic species of the prior art which contain optionally complexed or chelated organoaluminium compounds and water or a diol, or with species resulting from the combination of these catalysts, all of which constitute catalytic species of low activity.

It is surprising that the catalytic system according to the invention contributes towards the formation at high speed, and with very high yieds, of products having high molecular weights and viscosities.

The process of the invention is applicable to the polymerisation and copolymerisation of oxirane derivatives in general. A non-limitative list of oxirane compounds which are suitable for polymerisation or copolymerisation according to the invention so as to form substantially amorphous homogeneous products of high molecular weight includes the epoxy alkanes, halogenoepoxyalkanes, and glycidyl ethers, and in particular ethylene and propylene oxides, epichlorohydrin, and allylglycidyl ether.

The alkyl and alkoxyl derivatives of aluminium which are particularly suitable as catalysts for the polymerisation and copolymerisation of oxirane compounds are those corresponding to the general formula above, in which $n$ and $m$ represent whole numbers between 0 and 7 the total of which is at least equal to 1; R, R', R", and R''' represent straight or branched $C_1$–$C_{18}$ alkyl chains, and $R^1$ represents a straight or branched $C_3$–$C_6$ alkylene chain in which the main chain contains from 3 to 4 carbon atoms.

The best results are obtained with alkyl and alkoxyl aluminium derivatives according to the general formula above in which $n$ and $m$ are both equal to 1, R, R', R", R''', X, and X' all represent an isobutyl chain, and $R^1$ represents a butylene chain.

It is emphasized that the presence of tetrahydrofuran as complexing agent for organoaluminium compounds is absolutely necessary for obtaining catalytic systems by the process of the invention.

The alkyl and alkoxy derivatives of aluminium may be obtained in various ways. Their method of preparation is not critical, and those methods indicated below are given by way of example without limitation. They are generally prepared in the presence of tetrahydrofuran so as to obtain the desired catalyst in a single stage.

A particularly simple operating procedure consists in reacting, in the presence of tetrahydrofuran, a mixture of water and diol with an organoaluminium compound of the general formula RXX'Al in which R represents a hydrocarbon group containing 1 to 18 carbon atoms, and X and X' represent hydrogen, chlorine, or a group R.

Particularly suitable are the trialkylaluminiums containing 1 to 18 carbon atoms in their alkyl chain, alkyl aluminium monochlorides, alkylaluminium dichlorides, and mono- and dialkylaluminium hydrides. The best results are obtained with trialkylaluminiums containing straight or branched $C_1$–$C_5$ alkyl chains, particularly triisobutylaluminium.

The diols which can be used for the preparation of catalysts contain from 2 to 20 carbon atoms. Their hydrocarbon chains may be saturated or unsaturated, linear, branched, or cyclic. Particularly suitable are the alkane diols containing 3 to 6 carbon atoms in which the hydroxyl groups are fixed on carbon atoms separated by 1 to 2 carbon atoms, and the alkenediols 1.4, 1.5, and 1.6. Butanediol is very particularly suitable for the production of catalysts by the process of the invention.

Another suitable operating procedure for obtaining active catalysts by the process of the invention consists in reacting, once again in the presence of tetrahydrofuran, a diol and a compound of the general formula $(RXAl)_2O$, resulting from the reaction of 2 moles of a compound of the formula RXX'Al as defined above with 1 mole of water.

Catalysts according to the invention can also be obtained by reacting, in the presence of tetrahydrofuran, a diol complying with the criteria indicated above with a mixture of organoaluminium compounds of the general formulae RXX'Al and $(RXAl)_2O$ as defined above, or else by reacting water with a mixture of organoaluminium compounds of the general formulae RX'Al and $(RXAlO_2R^1$ resulting from the reaction of one mole of diol with two moles of a compound of the general formula RXX'Al as defined above.

The molar proportions of the reactants used for the production of the alkyl and alkoxyl derivatives of aluminium by the process of the invention are not critical and may vary to a fairly large extent. Nevertheless, it is advantageous to use a molar excess of aluminium in relation to the hydroxyl reactant which comprises, as the case may be, water, diol, or a mixture of water and diol.

Particularly active catalysts are obtained when using 0.01–1 mole of hydroxyl reactant and 0.1–20 moles of tetrahydrofuran per mole of aluminium. It is preferred to use 0.2–0.9 mole of hydroxyl reactant and 1–5 moles of tetrahydrofuran per mole of aluminium.

The catalytic concentration may vary to a fairly large extent. From 0.001 to 0.1 mole of aluminium is generally used per mole of monomer or per mole of monomer mixture, preferably from 0.01 to 0.05 mole of aluminium per mole of monomer or per mole of monomer mixture.

The method of production of the catalyst is not critical. It may be pure or dissolved in an inert diluent, such as hexane, heptane, etc. The reaction may be carried out between —70 and +70° C., preferably between —30 and 20° C. It should be effected with the exclusion of air. The order of introduction of the tetrahydrofuran has no effect on the activity of the catalyst.

A particularly simple preferred operating procedure consists in introducing the mixture of hydroxyl reactant and tetrahydrofuran drop by drop into a solution of the alkyl derivative or derivatives of aluminium in an inert diluent, this solution having been cooled to about —20° C. and flushed with pure dry nitrogen. The resulting catalytic solution may optionally be subjected to ageing for several days at ambient temperature and in an inert atmosphere.

The polymerisation of the oxirane compounds is effected in known manner, in the absence of humidity, by introducing catalytic solution into a solution of the monomer or monomers in a diluent, this solution having been flushed with nitrogen. The selection of the diluent is not critical. The polymerisation by the process of the invention is advantageously effected in such varying diluents as the ethers, such as ethyl ether or tetrahydrofuran, alkanes such as hexane, aromatic hydrocarbons such as benzene and toluene, halogenated hydrocarbons such as methylene chloride, or mixtures thereof.

Catalysts productd by the process of the invention are also suitable for the polymerisation of a mixture of oxirane derivatives. They are even particularly advantageous in this case, since they ensure very high conversion rates within reasonable periods of time, whereas known catalysts have very poor copolymerisation activity and consequently cannot be used industrially.

The following examples illustrate the process of the invention, without however limiting it.

EXAMPLES 1 to 6

These examples, of which the special characteristics are shown in Table I, relate to the homopolymerisation of epichlorohydrin and illustrate the surprising activity of the catalysts of the invention (examples No. 2, 3, 4, and 5) as compared with the catalysts of the prior art (examples No. 1 and 6).

The catalysts are all produced by the operating procedure described below.

Production is effected in a 500 cc. balloon flask having three necks and provided with a glass-bladed agitator, a thermometer, an introduction ampoule, and also a device for introducing nitrogen. A vacuum is created three times, followed by flushing-out with nitrogen so as to drive out all the air contained in the balloon flask and the introduction ampoule.

100 g. of hexane and 43.8 g., that is to say 0.22 mole, of triisobutylaluminium are introduced into the flask and this mixture is cooled to —20° C. A solution containing 100 g. of hexane and also a mixture of water, butanediol, and tetrahydrofuran in the respective amounts corresponding to the molar compositions of the catalyst shown in Table I are then introduced drop by drop.

The catalytic solution is kept under agitation at —20° C. for one hour. It is then allowed to return to ambient temperature and kept at that temperature for 5 days with the exclusion of air.

Polymerisation is effected under autogenous pressure at 30° C. in a mixture of ethyl ether and hexane containing 136.5 g. of ether and 26.5 g. of hexane per mole of epichlorohydrin. For each polymerisation test, the catalytic concentration amounts to 0.02 mole of aluminium per mole of epichlorohydrin.

TABLE I[1]

| Example number | Starting constituents of the catalytic system, content in moles | | | | Duration of test, hours | Conversion rate, percent ether insoluble matter | Viscosity at 25° C. in DMF (concentration: 2 g./l.) dl./g. | | Crystallinity index RX |
| --- | --- | --- | --- | --- | --- | --- | --- | --- | --- |
| | TIBAL | THF | Butanediol 1,4 | Water | | | Reduced | Inherent | |
| 1 (reference) | 1 | 3.7 | 0.40 | 0.00 | 5 | 16 | 30.50 | 9.80 | 0.26 |
| 2 | 1 | 3.7 | 0.45 | 0.05 | 5 | 90 | 35.01 | 10.40 | 0.23 |
| 3 | 1 | 3.7 | 0.40 | 0.10 | 1 | 100 | 33.22 | 10.14 | 0.23 |
| 4 | 1 | 3.7 | 0.25 | 0.25 | 2 3 | (³) | 27.00 | 9.28 | 0.11 |
| 5 | 1 | 3.7 | 0.10 | 0.40 | 3 | 100 | 35.99 | 10.55 | 0.17 |
| 6 (reference) | 1 | 3.7 | 0.00 | 0.50 | 24 | 38 | | 3.7 | 0.26 |

[1] Key to abbreviations: DMF=dimethylformamide; THF=tetrahydrofuran; TIBAL=triisobutylaluminium.
² Minutes.
³ Very high, reaction could not be checked.

The samples of polyepichlorohydrin obtained in examples 1 to 6 were subjected to gel permeation chromatography (GPC) at 45° C. in the presence of DMF as solvent. The dilution volume is shown on the abscissa and the Δ refraction indices on the ordinate in the diagram in the accompanying FIG. 1. The chromatogram corresponding to example 4 is shown in solid lines and that corresponding to example 6 in broken lines. The chromatograms corresponding to examples 1, 2, 3, and 5, which are not reproduced in the enclosure, are similar to that of example 4.

Comparison of the results in Table I and of the curves of the diagram in FIG. 1 shows the advantage of the catalysts of the invention, which combine high activity with the obtaining of products having exclusively high molecular weights and close distribution of molecular weights.

EXAMPLES 7 TO 9

These examples, the characteristics of which are shown in Table II, relate to the homopolymerisation of epichlorohydrin in the presence of catalysts of the invention which are produced by the action of water or diol on one or more alkyl derivatives of aluminium.

The general operating conditions are identical with those described above in connection with the production of the catalysts mentioned in Table I. The catalysts of examples 7, 8, and 9 were also subjected to ageing for 5 days.

The polymerisation of epichlorohydrin is effected under conditions absolutely identical with those of examples 1 to 6. The catalytic concentration also amounts to 0.02 mole of aluminium per mole of epichlorohydrin.

The polymerisation of the epichlorohydrin is effected under conditions identical with those of example 1 to 6. After polymerisation for 24 hours the conversion rate amounts to only 27.5% and the polymer insoluble in ethyl ether has reduced and inherent viscosities, measured under the conditions described in Table I, of 7.48 and 4.57 dl./g. respectively.

Figure 2:
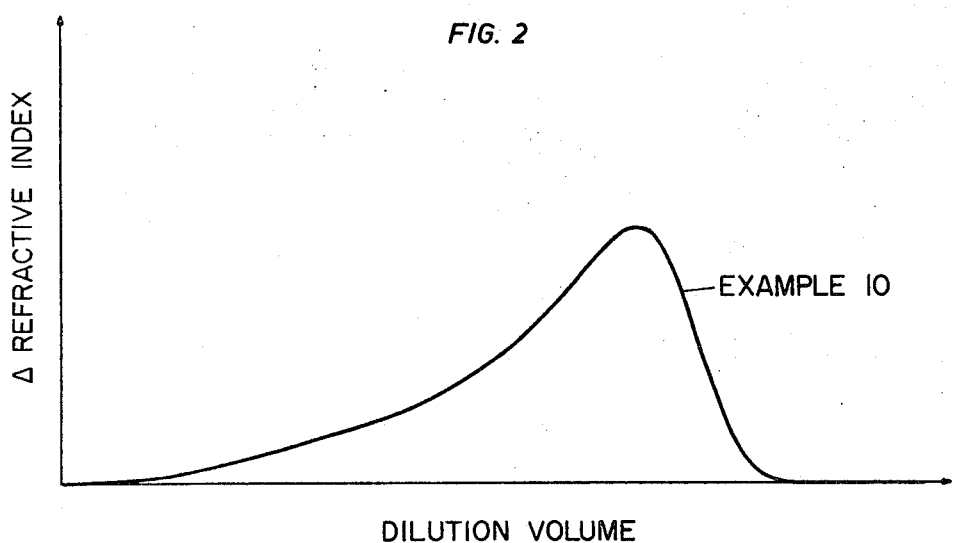

The results of example 10 are to be compared with those of example 4 in Table I. The curve shown as a solid line in the diagram in FIG. 1, corresponding to example 4, is to be compared with that shown in the diagram of FIG. 2 in which the coordinates are identical to those of FIG. 1, obtained by gel permeation chromatography under the conditions described above of a polyepichlorohydrin sample produced in accordance with example 10.

From these comparisons it is clear that the catalysts of the invention constitute a new catalytic species having high activity for the polymerisation of oxirane derivatives.

EXAMPLES 11 TO 13

The examples shown in Table III relate to the copolymerisation of epichlorohydrin and propylene oxide.

Examples 11 to 13 are carried out in the presence of a catalyst produced by the process of the invention and the composition of which is shown in example No. 3 in Table I.

The copoylmerisation conditions are identical with those of the homopolymerisation described above, that is to say:
Temperature: 30° C.
Diluent: ether/hexane mixture comprising 136.5 g. and 26.5 g. respectively per mole of the monomer mixture.

TABLE II

| Example number | Starting constituents of the catalytic system, contents in moles | | | | | | Duration of test, minutes | Conversion rate, percent ether insoluble matter |
|---|---|---|---|---|---|---|---|---|
| | Aluminium derivatives— | | | THF | Butane-diol 1,4 | Water | | |
| | TIBAL | [(iC₄H₉)₂Al]₂O | [(iC₄H₉)₂AlO]₂C₄H₈ | | | | | |
| 7 | | 0.5 | | 3.6 | 0.25 | | 10 | 80 |
| 8 | 0.5 | 0.25 | | 3.6 | 0.25 | | 75 | 95 |
| 9 | 0.5 | | 0.25 | 3.6 | | 0.25 | 3 | (¹) |

¹ Very high, reaction could not be checked.

The physical characteristics of the samples of polyepichlorohydrin obtained in examples 7 to 9 are in every respect comparable with those shown in Table I for examples 2 to 5.

Catalytic concentration: 0.02 mole of aluminium per mole of comonomer mixture.

The duration of the polymerisation amounts to 23 hours in all cases.

TABLE III

| Example number | Composition of initial mixture, molar percent | | Conversion rate | Viscosity in DMF, 25° C. (concentration 2 g./l.) dl./g. | | Crystallinity index RX | Vitreous transition temperature, °C. | Composition of copolymer ¹ weight percent | |
|---|---|---|---|---|---|---|---|---|---|
| | Epichlorohydrin | Propylene oxide | | Reduced | Inherent | | | epichlorohydrin | Propylene oxide |
| 11 | 95 | 5 | 100 | 24.02 | 8.77 | 0.03 | −27 | 95 | 5 |
| 12 | 90 | 10 | 100 | 23.34 | 8.65 | 0.02 | −27 | 92 | 8 |
| 13 | 80 | 20 | 82 | 17.66 | 7.65 | <0.01 | −42 | 84.5 | 15.5 |

¹ According to the chlorine content of the copolymer.

EXAMPLE 10 (REFERENCE)

This example shows that the catalysts according to the process of the invention do not in any way constitute the product resulting from the simple combination of known catalytic systems based on trialkylaluminium, tetrahydrofuran, and of water and a diol respectively.

The catalyst is produced by mixing in equimolar proportions a first catalyst formed from one mole of triisobutylaluminium, 3.7 moles of tetrahydrofuran, and 0.5 mole of butanediol, and a second catalyst formed from one mole of triisobutylaluminium, 3.7 moles of tetrahydrofuran, and 0.5 mole of water, so that the mixture has a molar composition identical to that of the catalyst of example 4 of Table I.

All the other operating conditions are identical to those described above in connection with the production of the catalysts shown in Table I. The catalyst was likewise subjected to ageing for 5 days.

Examples 11 to 13 in Table II show the activity of the catalysts forming the object of the present invention for the copolymerisation of epichlorohydrin and propylene oxide.

Figure 3:
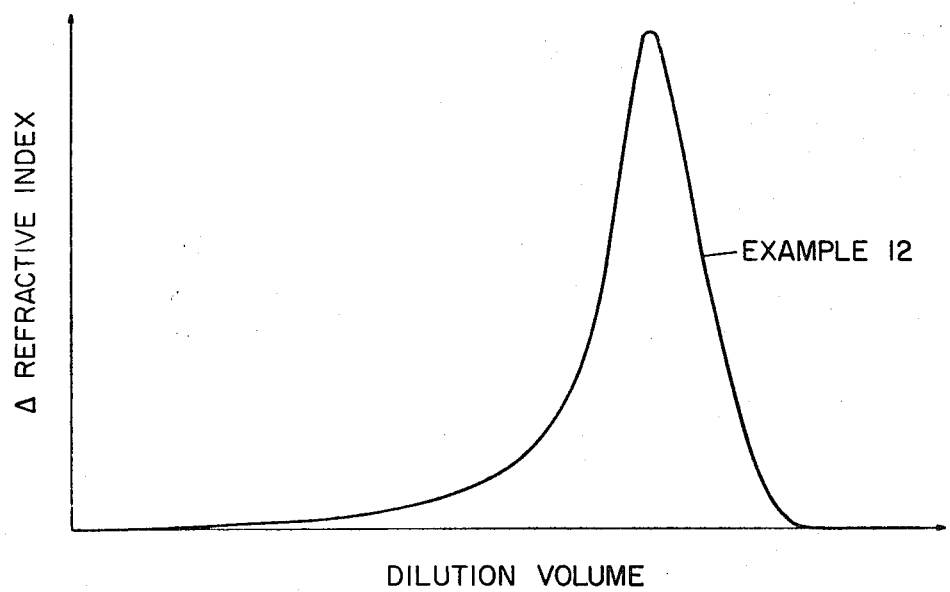

The chromatogram shown in the diagram in the accompanying FIG. 3, in which the co-ordinates are likewise identical with those of FIG. 1, and which was obtained by gel permeation chromatography at 45° C. in the presence of DMF as solvent, corresponding to the sample of copolymer produced in accordance with example 12, shows that the copolymers produced have high molecular weights and a narrow molecular weight distribution.

The chromatograms corresponding to examples 9 and 11, not reproduced, are similar to that of diagram III.

EXAMPLES 14 TO 22

These examples, which are shown in Table IV, relate to the copolymerisation of epichlorohydrin (EPI) with ethylene oxide (OE), propylene oxide (OP), and allyglycidyl ether (EAG). This table contains examples giving a comparison with known catalysts.

Examples 14 to 16 are carried out in the presence of a catalyst produced by the process of the invention, the composition of which is shown in example No. 4 in Table I.

The reference examples 17 to 19 are carried out in the presence of a known catalyst produced in accordance with Example 1 of United States Pat. 3,058,923, and contain 3.7 moles of tetrahydrofuran and 0.4 mole of butanediol 1,4 per mole of triisobutylaluminium.

The reference examples 20 to 22 are carried out in the presence of a known catalyst produced in accordance with Example 8b of the French Pat. No. 1,229,090 mentioned above, containing 1 mole of tetrahydrofuran and 0.7 mole of water per mole of triisobutylaluminium.

The copolymerisation conditions are identical with those of examples 11 to 13 (Table III), except that tests 14, 17, and 20 are carried out not in an ether/hexane mixture, but in benzene, at the rate of 200 g. of benzene per mole of comonomer mixture.

Examples 16, 19, and 22 lasted 24 hours, while all the other examples lasted 5 hours.

TABLE IV

| Example number | Composition of initial mixture molar percent | | | | Conversion rate, percent | Viscosity in DMF, 25° C. concentration: 2 g./l. dl./g. | | Crystallinity index RX | Vitreous transition temperature, °C. | Composition of copolymer [1] weight percent | | | |
|---|---|---|---|---|---|---|---|---|---|---|---|---|---|
| | EPI | CE | OP | EAG | | Reduced | Inherent | | | EPI | OE | OP | EAG |
| 14 | 90 | 10 | | | 100 | 11.41 | 5.95 | 0.08 | −27 | 93 | 7 | | |
| 15 | 80 | | 20 | | 100 | 26 | 9.1 | 0 | −35 | 86 | | 14 | |
| 16 | 95 | | | 5 | 100 | ND | ND | 0.13 | −30 | 94 | | | 6 |
| 17 (reference) | 90 | 10 | | | 0 | | | | | | | | |
| 18 (reference) | 80 | | 20 | | 9 | 6.67 | 4.24 | 0.02 | −36 | 69 | | 31 | |
| 19 (reference) | 95 | | | 5 | <3 | 1.71 | 1.47 | ND | ND | 85 | | | 15 |
| 20 (reference) | 90 | 10 | | | 20 | 4.70 | 3.31 | 0.18 | −31 | 89 | 11 | | |
| 21 (reference) | 80 | | 20 | | 0 | | | | | | | | |
| 22 | 95 | | | 5 | 17 | 3.15 | 2.44 | ND | ND | 89 | | | 11 |

[1] According to the chlorine content of the copolymer. ND = not determined.

EXAMPLE 23

This example relates to the copolymerisation of epichlorohydrin with propylene oxide and allylglycidyl ether with a catalyst identical to that of Example 4.

The polymerisation, which took 5 hours, was effected at 30° C. in benzene at the rate of 200 g. of benzene per mole of comonomer mixture. The catalytic concentration is 0.02 mole of aluminium per mole of comonomer mixture. The composition of the latter is as follows:

Epichlorohydrin: 88.5 mole percent
Propylene oxide: 8.5 mole percent
Allylglycidyl ether: 3.0 mole percent The conversion rate was 82% and the polymer obtained had a reduced viscosity at 25° C. in DMF (concentration 2 g./l.) of 5.38, an inherent viscosity of 0.365, a crystallinity index measured by X-rays of 0, and finally a vitreous transition temperature of −30° C.

What is claimed is:

1. A process for the polymerization of a mono-oxirane compound in contact with a catalyst composed of an organoaluminium compound complexed by tetrahydrofuran, wherein the organoaluminium compound has the general formula

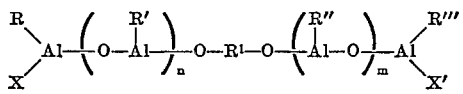

in which $n$ and $m$ represent whole numbers between 0 and 10 the total of which is equal to at least 1; R, R′, R″, and R‴ represent hydrocarbon groups containing from 1 to 18 carbon atoms; X and X′ represent hydrogen, chlorine, or a group R, and $R^1$ represents a hydrocarbon group containing from 2 to 20 carbon atoms.

2. A process according to claim 1, wherein the hydrocarbon groups R, R′, R″, and R‴ are selected from $C_1$ to $C_5$ alkyl groups.

3. A process according to claim 2, wherein the hydrocarbon groups R, R′, R″ and R‴ are isobutyl groups.

4. A process according to claim 1, wherein the groups X and X′ are groups R.

5. A process according to claim 1, wherein the group $R^1$ is selected from unbranched or branched $C_3$ to $C_6$ alkylene groups in which the principal chain contains from 3 to 4 carbon atoms.

6. A process according to claim 5, wherein the group $R^1$ is a tetramethylene group.

7. A process according to claim 1, wherein the numbers $n$ and $m$ are selected from whole numbers between 1 and 7, the total of which is equal to at least 1.

8. A process according to claim 7, wherein the numbers $n$ and $m$ are equal to 1.

9. A process according to claim 1, wherein from 0.1 to 20 moles of tetrahydrofuran are complexed per mole of aluminium.

10. A process according to claim 9, wherein from 1 to 5 moles of tetrahydrofuran are complexed per mole of aluminium.

11. A process according to claim 1, wherein said oxirane derivative is selected from the group consisting of ethylene oxide, propylene oxide, epichlorohydrin, and allylglycidyl ether and mixtures thereof.

12. A process according to claim 11, wherein epichlorohydrin is homopolymerized.

13. A process according to claim 11, wherein a mixture of epichlorohydrin and ethylene oxide is polymerized.

14. A process according to claim 11, wherein a mixture of epichlorohydrin and propylene oxide is polymerized.

15. A process according to claim 11, wherein a mixture of epichlorohydrin and allylglycidyl ether is polymerized.

16. A process according to claim 11, wherein a mixture of epichlorohydrin, propylene oxide, and allylglycidyl ether is polymerized.

References Cited
UNITED STATES PATENTS 3,058,923  10/1962  Kutner _____ 260—2
3,642,667  2/1972   Steller _____ 260—2 A
3,645,920  2/1972   Schlatzer _____ 260—2 A WILLIAM H. SHORT, Primary Examiner E. A. NIELSEN, Assistant Examiner U.S. Cl. X.R.

252—431 R; 260—88.3 A, 615 B